Sept. 18, 1923.
J. R. TRIGWELL
KNIFE SHARPENER
Filed April 19, 1923   5 Sheets-Sheet 1
1,468,611
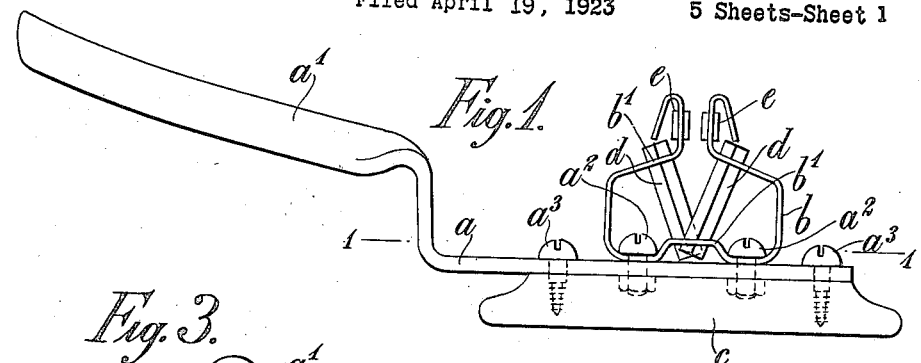
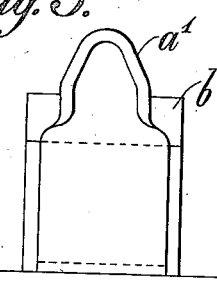
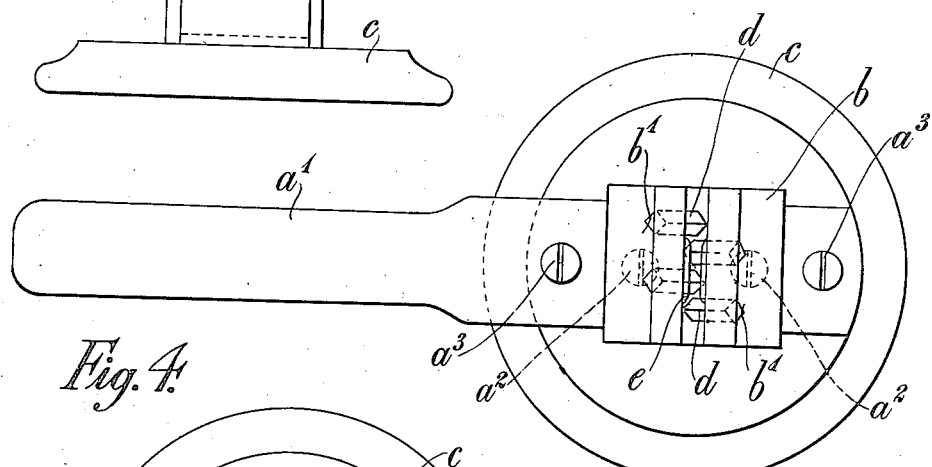
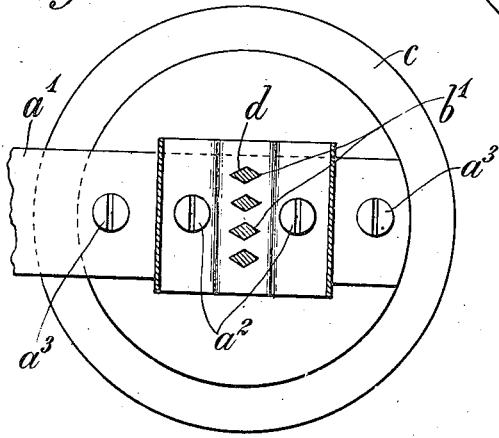
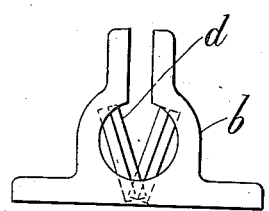
Inventor
J. R. Trigwell
By [signature] Atty.

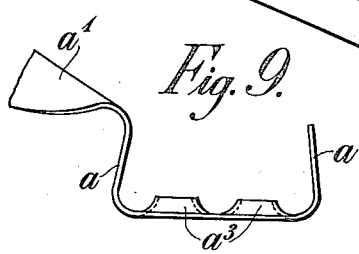
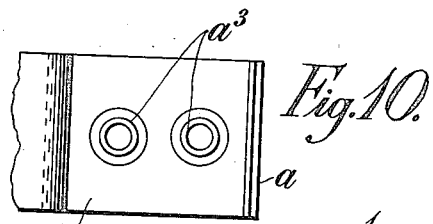
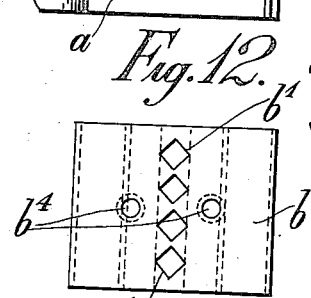
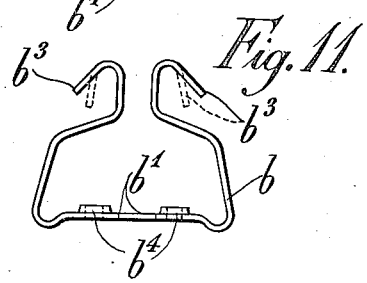
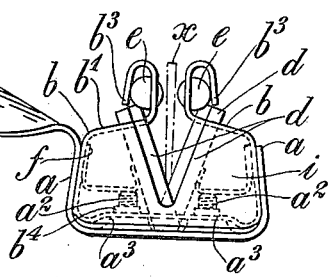
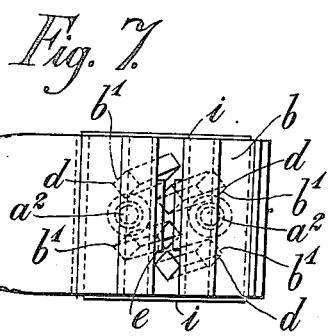
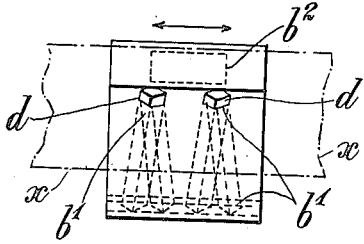

Sept. 18, 1923.
J. R. TRIGWELL
KNIFE SHARPENER
Filed April 19, 1923  5 Sheets-Sheet 3
1,468,611
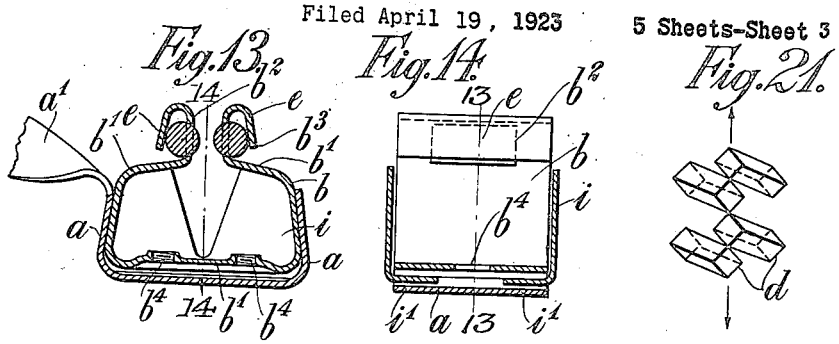
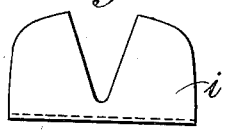
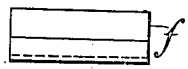
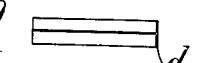
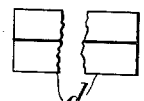
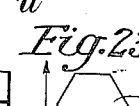
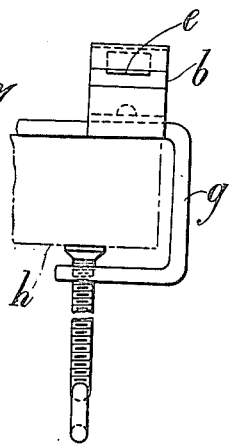
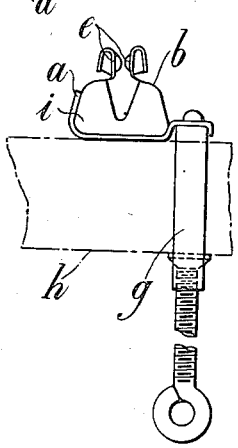
Inventor-
J. R. Trigwell
by
Atty.

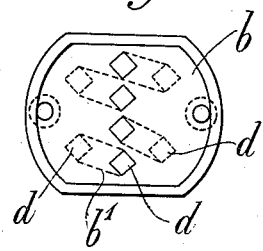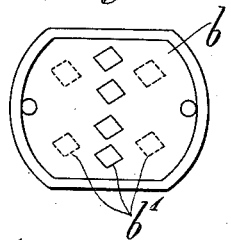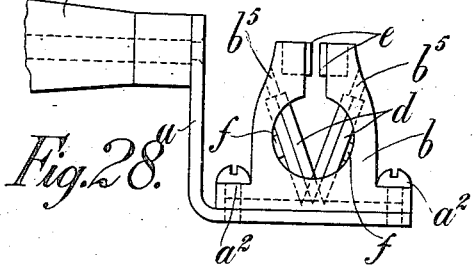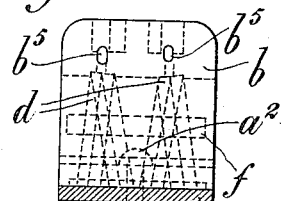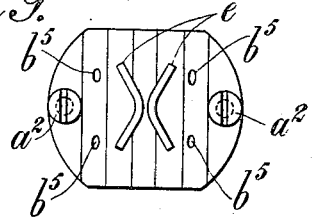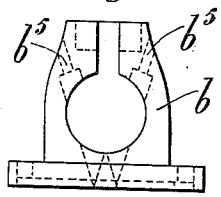

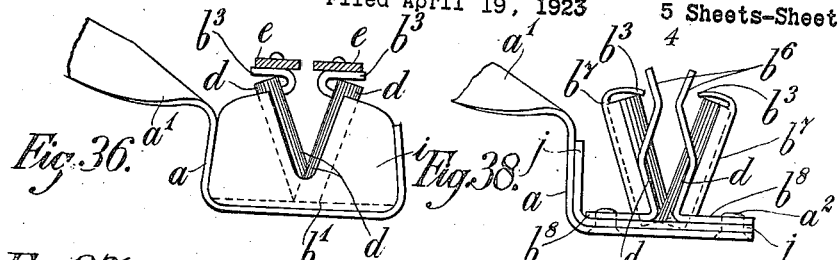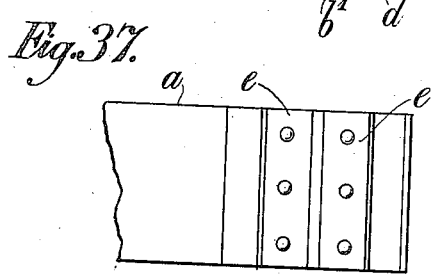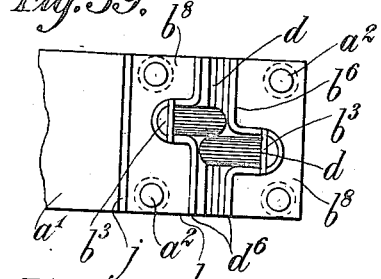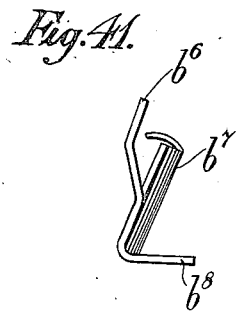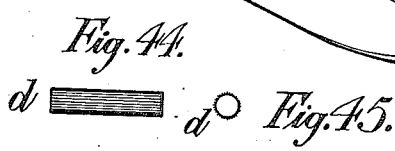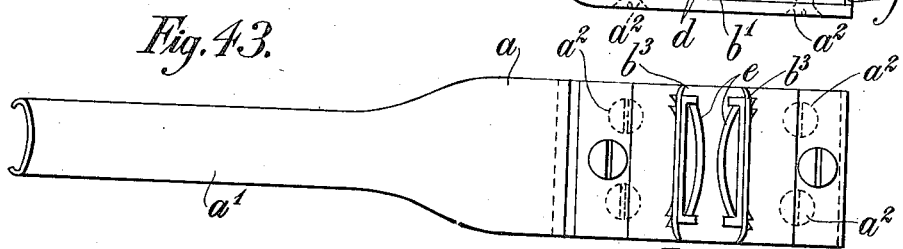

Patented Sept. 18, 1923.

1,468,611

UNITED STATES PATENT OFFICE.

JAMES RICHARD TRIGWELL, OF BRIXTON, LONDON, ENGLAND.

KNIFE SHARPENER.

Application filed April 19, 1923. Serial No. 633,216.

*To all whom it may concern:*

Be it known that I, JAMES RICHARD TRIGWELL, a subject of the King of Great Britain, residing at Brixton, in the county of London, in the Kingdom of England, have invented certain new and useful Improvements in or Relating to Knife Sharpeners, of which the following is a specification.

This invention relates to improvements in knife sharpeners for sharpening cutlery, especially including the stainless or the plated variety. The invention has more particular reference to knife sharpeners of the kind in which a plurality of sharpening elements are fixed or adjustably secured in a holder or handle in staggered relationship to each other and so as to cross each other at an acute angle when viewed in end elevation.

Heretofore in the above kind of knife sharpener it has been the common practice to make the sharpening elements of emery tablets, file elements, abrasive stones or flat cutters of metal, and it has also been proposed in one instance to employ steel wires and to removably arrange same in a box-like metal casing against the sides of a V-grooved supporting block of india-rubber, the said wires being housed in recesses at their lower ends and having bevelled upper ends adapted to be engaged by the top of the box-like casing. Another or usual kind of knife sharpener is constructed of two circular discs, the knife being drawn between the two edges. This kind of cutter forms a groove or an arc in cross section on each side of the knife and it is found that this form of edge is bad and not lasting.

Now according to the chief feature of the present invention I employ two or more "steels" of round, square, hexagon, grooved or inraced section, which are arranged in a holder so that they can be readily turned end for end and rotated to present their edges in a large number of positions.

The cutters or "steels" are slid into position lengthwise in a holder provided with perforations to fit the cross sections of the "steels" which are disposed at acute angles with each other so as to constitute V-shaped cutting edges suitable for shaping the edge of the knife correctly. The "steels" are made removable so that they can be rotated or turned end for end for presenting a fresh edge for sharpening the knife. The cutters or "steels" are arranged in staggered formation viewed in plan. The cutter holder is in one form made from a strip of sheet metal fastened to a sheet metal handle by screws.

In the accompanying drawings:

Figure 1 is a side view of one form of knife sharpener constructed according to the present invention;

Figure 2 is a plan thereof;

Figure 3 is an end view and Figure 4 is a horizontal section taken on the line 1—1 of Figure 1, and Figure 5 is a side view of a body member formed in one piece.

Figure 6 is an end elevation of a slight modified form of the invention;

Figure 7 is a plan thereof;

Figure 8 is a side view of Figure 5;

Figure 9 is a side view showing the frame with an integral handle separately;

Figure 10 is a plan thereof;

Figure 11 is an end view;

Figure 12 is an underside view of Figure 11;

Figure 13 is a vertical section taken on the line 13—13 of Figure 14;

Figure 14 is a vertical section taken on the line 14—14 of Figure 13;

Figure 15 is an end view of one of the end cover plates separately;

Figure 16 is a plan thereof;

Figure 17 is an end view of one of the packing plates separately;

Figure 18 is a side view thereof;

Figures 19 and 20 are respectively a side view and end view of a "steel" of square section, the arrow showing the direction for sharpening the knife;

Figure 21 is a diagrammatic underside view of the four "steels";

Figures 22 and 23 are respectively a side view and an end view of a steel of hexagon section, the arrow showing the direction for sharpening the knife;

Figures 24 and 25 are respectively a side view and end view of a grooved or "inraced" form of steel separately, the arrow showing the direction for sharpening the knife;

Figures 26 and 27 show end and side views respectively of the form of sharpener with a clamp attaching means:

Figure 28 is a side view of a device for sharpening knives, constructed according to the present invention in which the "steels" holder is made in one piece by die casting;

Figure 29 is a plan thereof, the handle being omitted;

Figure 30 is a view at right angles to Figure 28 partly in section;

Figure 31 is a bottom plan view of the same;

Figure 32 is an elevation of the body of the device without "steels";

Figure 33 is a bottom plan view of the body of the device without the "steels";

Figures 34 and 35 are respectively an edge view and a plan of the packing piece shown in Figure 30;

Figures 36 and 37 are respectively a side view and a plan of a portion of a knife sharpener showing a modified pad;

Figure 38 is a side view of a modified form of the device;

Figure 39 is a plan of Figure 38 and Figure 40 is a vertical section taken on the line 40—40 of Figure 38;

Figure 41 is a view of one part or fitting of Figure 38;

Figure 42 is a side view of a modified form of the device;

Figure 43 is a plan thereof, and

Figures 44 and 45 are respectively a longitudinal and end view of a circular and fluted "steel".

As shown, the reference letter $a$ represents the frame of the device on which the handle $a'$ is formed integral. The "steels" or "cutters" holder $b$ is fastened to the frame $a$ of the device by screws $a^2$. $b'$ are apertures provided in the "steels" holder $b$ at the top and bottom thereof to receive the steels $d$ which rest at their lower ends upon the frame $a$ and at their upper ends in the "steels" holder $b$. The "steels" $d$ in this case are assumed to be square in cross section. $e$ are pads which are constructed of vulcanite fibre, leather or similar materials the ends of which are passed through slots in the upper ends of the "steels" holder $b$ and which serve to protect stainless knives from abrasion when being sharpened and the pads also act as guides for the knife.

In the form shown in Figures 6 to 21 inclusive, in addition to the "steels" being staggered and inclined when viewed in end elevation, as shown at Figures 2 and 7, they are inclined to the direction of motion of the knife or when viewed in side elevation, as shown at Figures 8 and 21, so that by slightly lifting the knife at one or other end of the row of "steels", either a sharpened or a smooth or finished edge is obtained, the "steels" being inclined correspondingly. The "steels" holder $b$ is held in position by a frame $a$ by means of metal screws $a^2$ passing through the holder $b$ at the threaded holes $b^4$, the heads being held in coutersunk recesses $a^3$ formed in the frame $a$, and the opposite ends impinging upon metal packing plates $f$ which serve to check vibration. The pads $e$ are in this case formed cylindrical and held in position by making the slots $b^2$ in the "steels" holder $b$ smaller than the diameter of the pads $e$. The free ends $b^3$ of the "steels" holder $b$ in the position shown enable the pads $e$ to be placed in position after which the free ends $b^3$ are pressed down upon the pads $e$ into the position shown by dotted lines. $i$ are end cover plates which are formed with two flanges $i'$ which are pressed into the opening between the frame $a$ and adjacent part of the "steels" holder $b$ to make a neat appearance to the device.

In the example given at Figures 26 and 27 the frame $a$ of a knife sharpener similar to that lastly described and shown is attached to a clamp $g$ which is attached to a bench $h$, for use in restaurants and such places, or might be attached to a well-known form of knife cleaner by means of screws or otherwise.

The packing piece $f$ shown in Figures 34 and 35 assumes a nearly flat position, so that it exerts a pressure on the "steels" to prevent vibration. The "steels" holder $b$ is constructed by die casting of any suitable metal; or it might be made of hard wood with metal eyelets let in to carry the "steels" $d$ and the vertical limb of the frame $a$ is fixed to a wood handle $a'$ and the frame $a$ is fixed to the bottom of the "steels" holder as hereinbefore described with respect to Figures 6 to 21. $b^5$ are perforations on each side of the "steels" holder to enable a pin to force the "steels" $d$ out at the bottom of the "steels" holder $b$, when their position is required to be changed.

The pad $e$ shown in Figures 36 and 37 consists of a modified or plain strip with the inner edge presented to the knife $x$ and is fastened by rivets to the upper horizontal face of the "steels" holder $b$.

The device as shown in Figures 38 to 41 is constructed in three pieces showing a separate base plate $j$ and two semi-circular inclined fittings $b^7$ in which the "steels" $d$ rest and are held at the top by part of the metal being bent over at $b^8$.

Two vertical arms $b^6$ act as guides for the knife. The semicircular inclined fittings $b^7$ are supported upon the base plate $j$ by flanges $b^8$ through which screws $a^2$ pass to secure them in position.

In the form shown in Figures 42 to 45 the "steels" holder is formed in five pieces $b$, $b^9$, $j$, to suit the convenience of manufacture and material to be used and the pads $e$ are formed of long strips of vulcanite fibre or the like threaded through slots in the guide plates $b^3$, as shown also in Figures 1 and 2.

What I claim is:—

1. A knife sharpener including a holder and a plurality of pairs of sharpening steels supported in said holder and crossing to provide a sharpening juncture, each of the steels being supported at the extreme upper and lower ends in openings formed in the upper and lower portions of the holder, the lower openings being aligned transversely of the holder.

2. A knife sharpener including a holder and a plurality of pairs of sharpening steels supported in said holder and crossing to provide a sharpening juncture, each of the steels being supported in the holder at the extreme upper and lower ends, and pads carried by the upper portion of the holder.

3. A knife sharpener including a holder and a plurality of pairs of sharpening steels supported in said holder and crossing to provide a sharpening juncture, each of the steels being supported at the extreme upper and lower ends in holes formed in the holder and means beyond the upper holes for securing the upper ends of the steels relative to the holder to prevent endwise movement of the steels.

4. A knife sharpener, comprising a holder having a base portion formed with holes in alignment, upper sections spaced apart to provide a knife entrance and formed with holes, steels seated at their lower ends in the holes in the base portion and held at their upper ends in the holes in the upper sections of the holder, said steels crossing each other in line with the knife entrance, and means integral with the holder to overlie the steels beyond the holes in the upper section of the holder.

5. A knife sharpener, comprising a holder and a plurality of pairs of steels arranged therein, the lower ends of all steels being in alignment transversely of the holder, with said steels crossing alternately above their lower ends, the upper ends of the steels of one pair being in alignment longitudinally of the holder with the upper ends of adjacent steels of the other pair.

6. A knife sharpener, comprising a holder and a plurality of pairs of steels arranged therein, the lower ends of all steels being in alignment transversely of the holder with each of said steels inclining in two directons relative to the holder.

In testimony whereof I have hereunto signed my name.

JAMES RICHARD TRIGWELL.